United States Patent [19]

Ferralli

[11] Patent Number: 5,501,873
[45] Date of Patent: Mar. 26, 1996

[54] IMPACT SPRAY CLADDING OF INNERDUCT LINER

[75] Inventor: Michael W. Ferralli, Fairview, Pa.

[73] Assignee: Technology Licensing Company, Pittsburgh, Pa.

[21] Appl. No.: 379,947

[22] Filed: Jan. 27, 1995

[51] Int. Cl.$^6$ ............................. B05D 3/02; B05D 7/22
[52] U.S. Cl. .................... 427/195; 427/236; 427/271; 427/277; 427/216; 427/355; 427/359; 427/371; 427/393.5; 427/421
[58] Field of Search .................... 427/236, 355, 427/359, 371, 271, 316, 277, 393.5, 195, 421

[56] References Cited

U.S. PATENT DOCUMENTS

| | | | |
|---|---|---|---|
| 3,584,656 | 6/1971 | Van Assendelet | 138/129 |
| 4,243,699 | 1/1981 | Gibson | 427/236 |
| 4,791,965 | 12/1988 | Wynn | 138/146 |
| 5,271,974 | 12/1993 | Upchurch | 428/34.4 |

*Primary Examiner*—Janyce Bell
*Attorney, Agent, or Firm*—Titus & McConomy

[57] ABSTRACT

A conduit liner which is made by cladding the inner surface thereof with impact sprayed thereon while the conduit is heated. Preferably, the spray is polymeric material which may include a low friction additive.

6 Claims, 1 Drawing Sheet

5,501,873

IMPACT SPRAY CLADDING OF INNERDUCT LINER

FIELD OF INVENTION

The present invention relates to conduit innerduct and specifically to an improved conduit or innerduct for cable and method of lining an innerduct or cable conduit with a lubricous, low friction material.

DISCUSSION OF PRIOR ART

It is a well known practice to place telecommunication cable innerduct in conduit to protect the cable. Typically, the conduit is laid in place or an innerduct is placed within the conduit and the cable is pulled therethrough. The innerduct serves as a guide and protector for the fragile telecommunications cable. To reduce the friction encountered during the pulling operation, various methods of lining the interior of the innerduct have been attempted. Heretofore, a significant limitation of reducing the friction involved in pulling a telecommunication cable through an innerduct has been the economy and efficiency of lining the innerduct with a proper low friction, lubricous material.

Innerducts and some conduits are typically polymeric tubes manufactured by extruding a thermoplastic polymer with a line or rope placed therein. This rope is subsequently used to pull the telecommunication cable through the innerduct or conduit. Considering the innerduct or conduit may be manufactured in lengths of 5000 feet, the process of pulling the telecommunication cable can be quite difficult and potentially damaging to the cable itself if significant friction is encountered between the inner surface of the innerduct and the cable.

One method used to reduce the friction is to texture the inner surface in order to reduce contact points between the cable and inner surface and, thus, the overall friction. However, this method is limited by the intrinsic properties of the innerduct or conduit material, by the material's ability to accept a texture, and by the physical distortion of the texture caused during the cable pulling process.

Another method involves lining the innerduct with a low friction, lubricous liner which is coextruded with the innerduct. This method has the disadvantage that the coextrusion processes create unnecessarily thick liners. These liners are much thicker than the a one-time cable pulling operation requires. Moreover, co-extrusion is an inefficient way of lining shorter lengths of innerduct or conduit. The process is significantly inefficient in energy use since it involves melting a significant amount of the liner material prior to 'thick cross section' application.

Another method involves the application of lubricating agents to the inner surface of the innerduct or conduits. This solution, however, is ineffective as well as troublesome since, during the pulling process, initial sections of the pulled-through cable tends to remove lubricating material for subsequent sections of the cable. The removal of the lubrication results in an increasing frictional gradient through the innerduct causing a potentially damaging stress gradient in the telecommunications cable. Furthermore, the use of lubricating materials to reduce the friction has a tendency to contaminate the telecommunications cable.

Accordingly it is an object of this invention to overcome the limitations of the prior art methods and provide a method of lining an innerduct with a thin lubricous material which exhibits properties of low friction and ability to be textured in order to aid in the placement and reduce the pull-through force required to install telecommunications cable. It is also an object of the present invention to provide an innerduct having an inner surface with a low coefficient of friction to facilitate pull-through of the cables. It is yet another object of this invention to provide a method of lining a duct with exceptionally thin lining material which will serve to reduce friction for the anticipated single pull-through process while simultaneously providing a material and energy efficient lining method. It is another object of this invention to provide a innerduct liner which may be compounded with materials known for their low friction properties. It is another object of this invention to provide a innerduct liner which is homogeneous such that surface wear of the liner will not result in exposure of a material displaying increased frictional properties. It is another object of this invention to allow a thin liner material to be deposited with a textured surface in order to reduce surface contact with a telecommunication cable and thus decreased friction during pull-through. It is another object of this invention to produce an innerduct liner by impact spray deposition of a polymer or other friction reducing material to the inner surface of an innerduct. It is another object of this invention to provide a method of lining an innerduct or conduit which is adaptable to manufacture of short lengths of innerduct or conduit. It is another object of this invention to provide a method of lining an innerduct or conduit which may easily be altered to provide a lining property variability along an innerduct or conduit length.

SUMMARY OF THE INVENTION

Generally, the present invention provides a method for cladding the inner surface of an innerduct which comprises the steps of applying a impact spray to the inner surface to form the clad inner liner. Preferably the spray comprises a lubricous, low friction polymer pellets or particles such as polyethylene, polytetrafluoroethylene, polyurylidene fluoride or other material and may also include a mixture of pigments, stabilizers, lubricating fillers or agents or other additives.

Preferably, the innerduct or conduit is heated to a temperature near the extrusion temperature of the innerduct or conduit. The pelletized or particulate material is sprayed onto the inner surface of the innerduct at a high velocity to provide a cladding on the inner surface by impaction.

It is preferred that a heated mandrel be used to contour the sprayed on inner surface. The mandrel is preferably heated to the fusion temperature of the coating. The contour can be grooves or other textures which provide a reduced contact area with the telecommunications cable thereby reducing frictional forces encountered during pull-through of the telecommunications cable. Other advantages of the invention will become apparent from a perusal of the following detailed description of a presently preferred embodiment of the invention taken in connection with the accompanying drawings.

PRESENTLY PREFERRED EMBODIMENT

Figure 1:
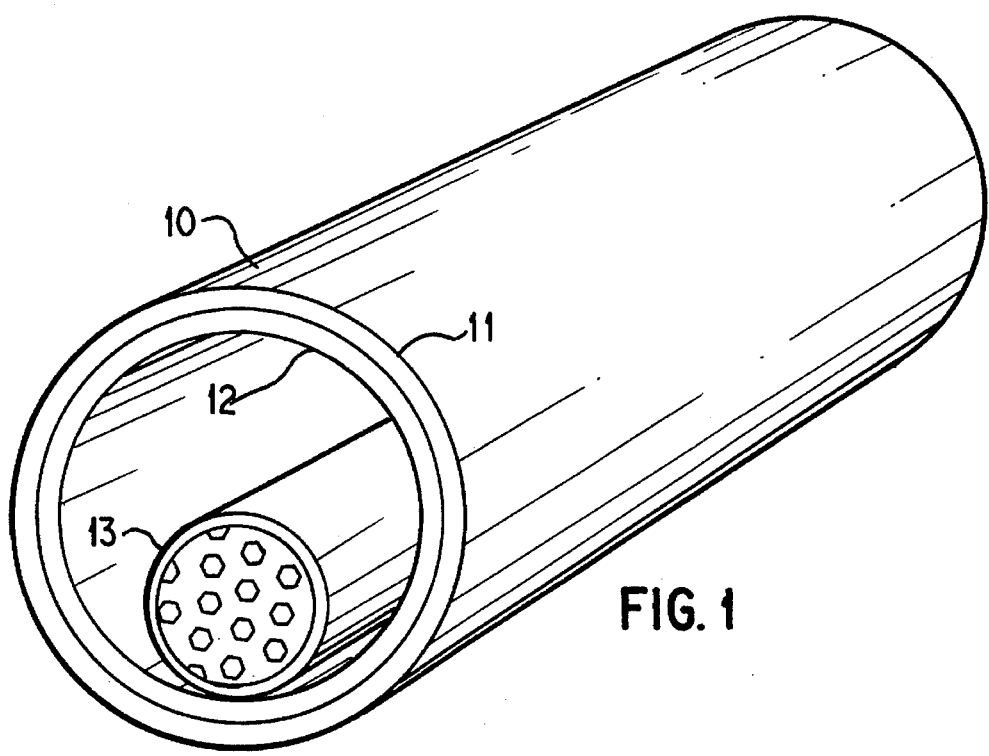
FIG. 1 is a perspective view of an innerduct or conduit formed in accordance with the present invention with a fiber optic telecommunications cable disposed therein.

Referring to FIGS. 1, an innerduct or conduit 10 formed in accordance with the present invention is illustrated. Innerduct 10 consists of outer tube 11 which is a polymer, typically polypropylene and formed by an extrusion process. Outer tube 11 has liner 12 which is formed by the impact spray enhanced deposition of a low friction, lubricous material, which may be polymeric pellets or particles, and which may contain agents and fillers which contribute to the lowering of the frictional properties of the liner when subjected to pull-through of telecommunications cable 13. Suitable material for the inner liner would be polyethylene, polytetrafluouroethylene, polyvinylidene fluoride and like polymeric materials having a low coefficient of surface friction. Suitable friction-reducing fillers include graphite, silicone oils, polytetrafluoroethylene and the like.

Figure 2:
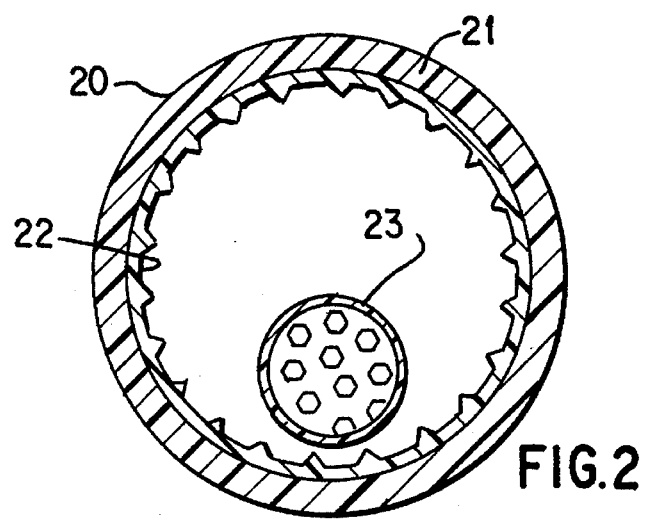
FIG. 2 is a cross sectional view of the innerduct or conduit formed in accordance with the present invention illustrating texture of the impact spray enhanced deposited liner.

Referring to FIG. 2, an innerduct 20 is formed in accordance with the present invention is illustrated. The innerduct consists of a outer tube 21 which is a polymer formed by an extrusion process and has a textured liner 22 which is formed by the impact spray enhanced deposition of a low friction, lubricous material, which is preferably a polymeric pellet, and which includes agents and fillers which contribute to the lowering of the frictional properties of the liner when subjected to pull-through of telecommunications cable 13. Suitable material for the inner liner would be polyethylene, polytetrafluoroethylene, polyvinylidene fluoride and the like.

Although FIGS. 1 and 2 illustrate a innerduct whose cross section is circular, it is to be understood that the innerduct 10 and 20 may have any desired cross-sectional shape such a square, rectangular, elliptical, triangular or other required shape for desired end use. Further the textured liner 22 may be formed with undulations having inward projecting ribs whose cross sections which may take on any shape including, but not limited to, square, rectangular, circular and polygonal shapes.

Figure 3:
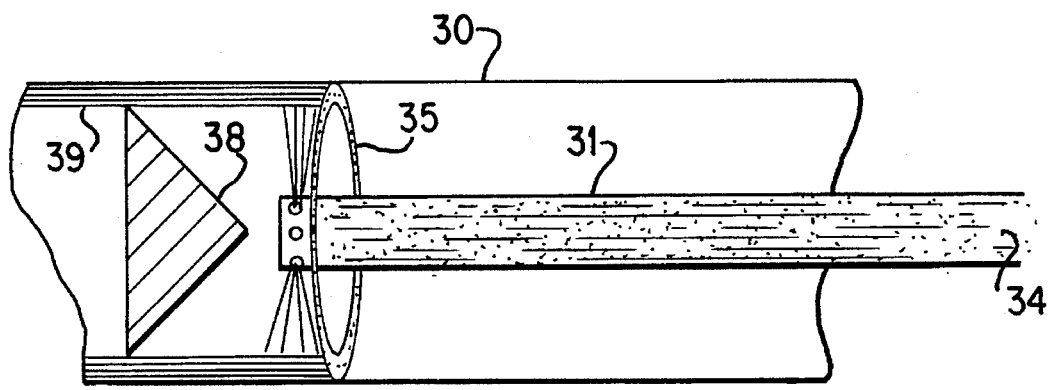
FIG. 3 is a schematic illustration of the preferred embodiment of the impact spray enhanced deposition process.

Referring to FIG. 3, a schematic illustrating a preferred embodiment of a process of forming the extruded innerduct with the impact spray enhanced deposition of a liner is shown. An innerduct or conduit 30, at or near its extrusion temperature has contained therein preferably before extrusion an orificed tube 31 connected to a source of high velocity pelletized or particulate material. Preferably, the source is a linear gun or high pressure, hot air. The polymeric material 34 in is forced through the orifice of electrode 31 which disperses the polymeric material 34 in a radially symmetric pattern 35. The polymeric material 34 is deposited on the interior of inner duct 30 owing to the elevated temperature of the innerduct 30 as well as the velocity of the impacting material 34. Optimally, a heated plug 38 acts to further fuse the polymeric material, causing it to form a film 39. The heated plug 38 may optionally have a contoured edge which is in contact with the polymeric film 39, thereby contouring it with a desired texture.

While the invention has been described in connection with what is presently considered to be the preferred embodiment, it is to be understood the invention is not to be limited to the disclosed embodiments, but on the contrary is intended to cover various modifications and equivalent arrangements included within the spirit of the scope of the appended claims.

What is claimed is:

1. A method of cladding the inner surface of an innerduct or conduit made from a thermoplastic polymer, said comprising the steps of:
    a. heating said innerduct or conduit to be clad to a temperature less than melting point of said innerduct or conduit, and
    b. spraying a polymeric material onto the heated inner surface of said innerduct or conduit at a velocity sufficient to impact said inner software to provide a coating thereover.

2. A method according to claim 1 wherein the polymer is filled with a powder chosen from a group consisting of graphite, talc and silica.

3. A method according to claim 1 wherein the polymeric material consists of a low friction polymer chosen from a group consisting of pelletized or particulate polyethylene, polytetrafluoroethylene, polyvinylidene fluoride, and mixtures of said polymers.

4. A method as set forth in claim 3 including the step of mixing said polymers with materials chosen from a group consisting of graphite and silicone oils.

5. A method according to claim 1 wherein the inner surface coating is imparted with textured surface by means of a heated plug.

6. A method according to claim 1 wherein the polymer is nonuniformly sprayed to a surface of said conduit to form a surface clad of non uniform thickness.

* * * * *

UNITED STATES PATENT AND TRADEMARK OFFICE
CERTIFICATE OF CORRECTION

PATENT NO. : 5,501,873

DATED : March 26, 1996

INVENTOR(S) : FERRALLI, Michael W.

It is certified that error appears in the above-identified patent and that said Letters Patent is hereby corrected as shown below:

In Column 4, Line 28, in the third line of part "b" of Claim 1, the word "software" should be changed to the word --surface--.

In Column 4, Line 32, the last word of Claim 2, "silica" should be changed to --silicone--.

Signed and Sealed this

Thirteenth Day of May, 1997

Attest:

BRUCE LEHMAN

Attesting Officer     Commissioner of Patents and Trademarks